(12) United States Patent
Grimmel et al.

(10) Patent No.: US 9,228,615 B2
(45) Date of Patent: Jan. 5, 2016

(54) SLIDING BLOCK FOR AN ARTICULATED SPINDLE

(75) Inventors: Rüdiger Grimmel, Netphen (DE); Christoph Sundermann, Hilchenbach (DE); Ralf Gehle, Lennestadt (DE)

(73) Assignee: SMS GROUP GMBH, Düsseldorf (DE)

( * ) Notice: Subject to any disclaimer, the term of this patent is extended or adjusted under 35 U.S.C. 154(b) by 0 days.

(21) Appl. No.: 13/509,731

(22) PCT Filed: Nov. 12, 2010

(86) PCT No.: PCT/EP2010/067373
§ 371 (c)(1),
(2), (4) Date: May 31, 2012

(87) PCT Pub. No.: WO2011/058133
PCT Pub. Date: May 19, 2011

(65) Prior Publication Data
US 2012/0244954 A1    Sep. 27, 2012

(30) Foreign Application Priority Data

Nov. 13, 2009   (DE) .................. 10 2009 053 129

(51) Int. Cl.
*F16D 3/26* (2006.01)
(52) U.S. Cl.
CPC ..................................... *F16D 3/265* (2013.01)
(58) Field of Classification Search
CPC ............. F16D 3/265; F16D 3/16; F16D 3/26
USPC .................. 464/105, 110, 150, 153
See application file for complete search history.

(56) References Cited

U.S. PATENT DOCUMENTS 1,231,249 A * 6/1917 Gardner .................... 464/110 X
1,413,848 A   4/1922 Frins
(Continued)

FOREIGN PATENT DOCUMENTS

DE   2251919   4/1974
DE   2656257   6/1978
(Continued)

OTHER PUBLICATIONS

English Language Translation of JPS55-154601. Aug. 2014.*
(Continued)

*Primary Examiner* — Gregory Binda
*Assistant Examiner* — Matthieu Setliff
(74) *Attorney, Agent, or Firm* — Lucas & Mercanti, LLP; Klaus P. Stoffel

(57) ABSTRACT

An articulated spindle (3) which is arranged in particular in a drive of a rolling mill, comprises a coupling sleeve for establishing a connection to an articulated head, or an articulated head (4) for establishing a connection to a coupling sleeve (2), wherein the tongue (1) of the coupling sleeve (2) engages with a cylindrical opening (5) of the articulated head (4) that is located transverse to the rotational axis. A sliding block (19) is arranged between the articulated head and the tongue (1), said block being formed by two sliding bodies (21, 22), which have rotational body contours (23, 24) in two portions, said sliding bodies being arranged rotatably in a rotational body-shaped recess (25, 31) adjusted to the shape of the sliding bodies (21, 22) such that they can perform a pivoting motion in the articulated head (4). The articulated spindle (3) is characterized in that the rotational body contours (23, 24) are designed to be concave or convex and the recess (25) is designed to be accordingly convex or concave.

8 Claims, 3 Drawing Sheets

(56) References Cited

U.S. PATENT DOCUMENTS

| | | | |
|---|---|---|---|
| 1,532,752 A | | 4/1925 | Johnson |
| 2,153,093 A | | 4/1939 | Magee |
| 2,260,567 A | * | 10/1941 | Gatke .......................... 464/110 |
| 2,305,699 A | | 12/1942 | Healy |
| 2,361,629 A | | 10/1944 | Irvin |
| 2,460,361 A | | 2/1949 | Petho |
| 2,895,314 A | * | 7/1959 | Helm .......................... 464/153 |
| 3,070,978 A | | 1/1963 | Langkop |
| 3,469,416 A | | 9/1969 | Snyder |
| 3,713,791 A | * | 1/1973 | Oakes |
| 4,324,113 A | * | 4/1982 | Leksen .......................... 464/110 |
| 5,288,271 A | * | 2/1994 | Nelson et al. |
| 5,496,219 A | * | 3/1996 | Anspach et al. |
| 7,186,182 B2 | * | 3/2007 | Wenzel et al. |
| 7,721,581 B2 | | 5/2010 | Sundermann |
| 8,033,917 B2 | * | 10/2011 | Prill et al. |

FOREIGN PATENT DOCUMENTS

| | | | |
|---|---|---|---|
| DE | 3000477 A1 * | 7/1987 | .................... 464/110 |
| FR | 624874 | 7/1927 | |
| GB | 262144 | 3/1927 | |
| GB | 979442 | 1/1965 | |
| GB | 284462 | 9/1996 | |
| JP | S55154601 | 11/1980 | |
| JP | S57155322 | 9/1982 | |
| WO | 2004072501 | 8/2004 | |

OTHER PUBLICATIONS

English translation of Office Action from Chinese Patent Office, Dec. 12, 2014, 4 pgs.

* cited by examiner

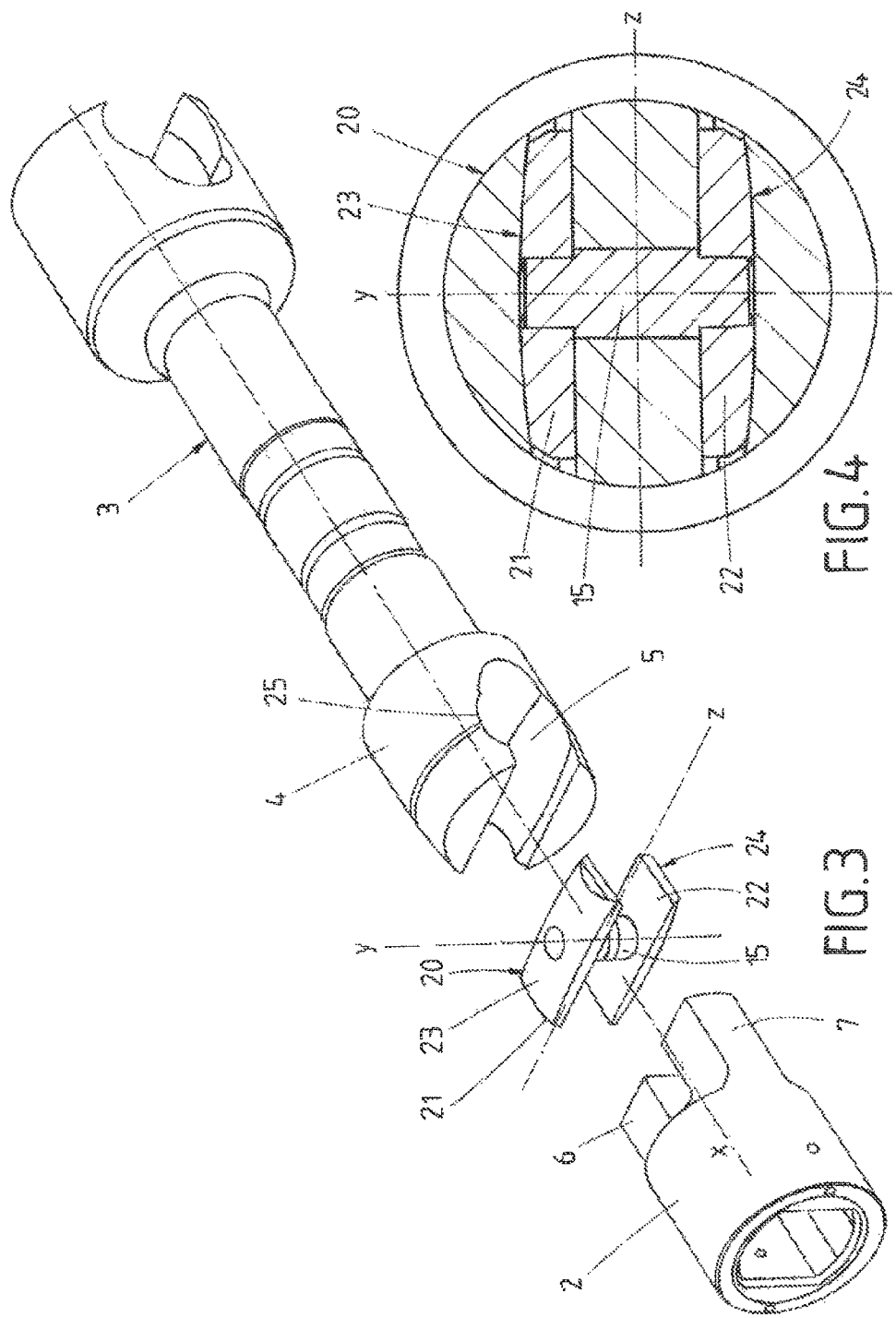

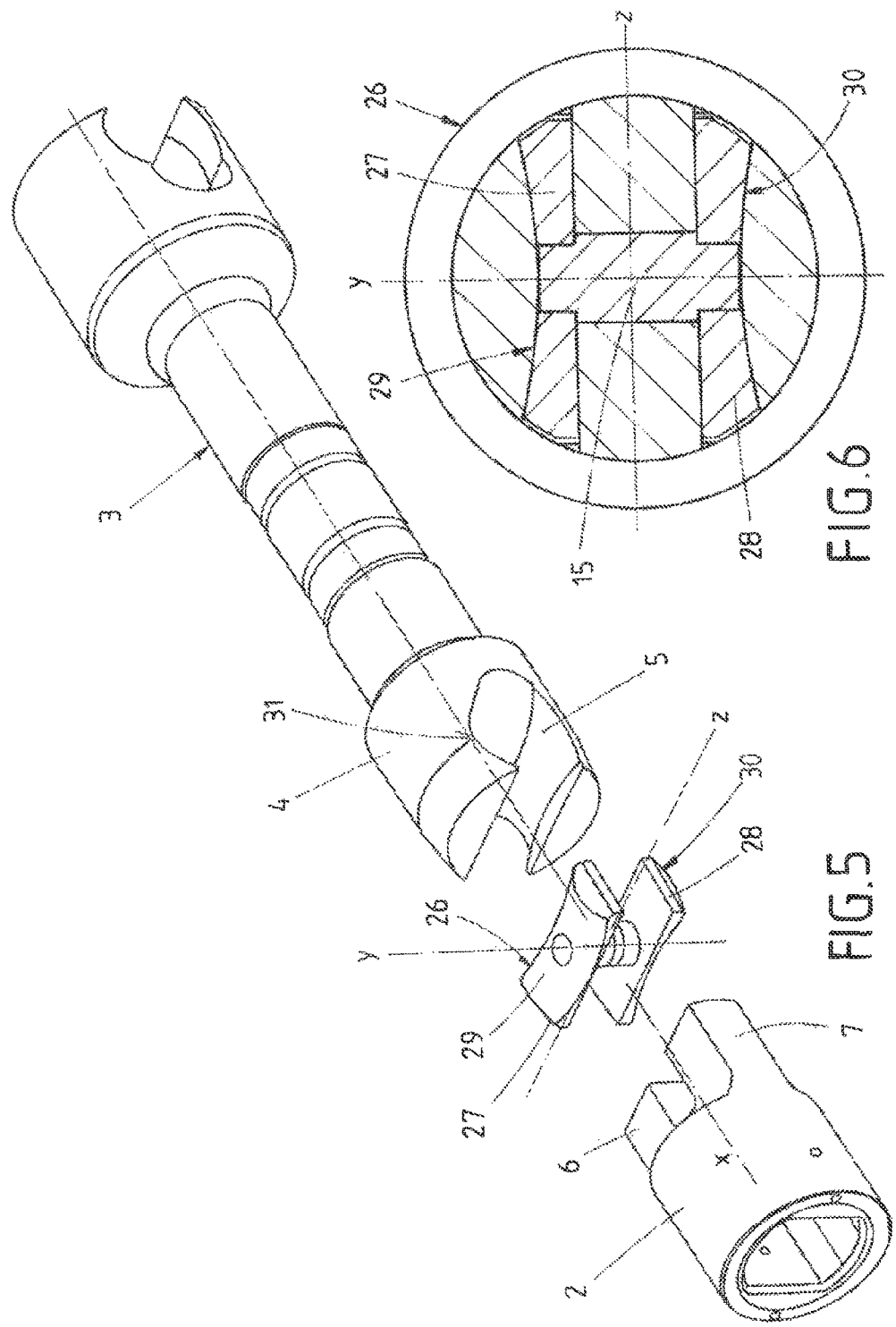

SLIDING BLOCK FOR AN ARTICULATED SPINDLE

The present application is a 371 of International application PCT/EP2010/067373, filed Nov. 12, 2010, which claims priority of DE 10 2009 053 129.7, filed Nov. 13, 2009, the priority of these applications is hereby claimed and these applications are incorporated herein by reference.

BACKGROUND OF THE INVENTION

The invention relates to a joint spindle arranged particularly in a drive of a rolling mill, which has a wobbler for effecting a connection with a joint head, or a joint head for effecting a connection with a wobbler, whose tongue engages in a cylindrical opening of the joint head extending transversely of the axis of rotation, wherein a sliding block is arranged between the joint head and the tongue, which sliding block is formed by two sliding bodies which have in partial areas thereof contours of a body of rotation, wherein the sliding bodies are arranged in a recess in the joint in such a way that they can carry out a pivoting movement in the joint head.

Sliding blocks, also called joint blocks, are known. The sliding block is composed of a non-metal or metal material, and is used in joint spindles and joint coupling heads of rolling mill drives. When using a joint block in the heads of the joint spindles arranged on both sides, or in the subsequent coupling heads, a flat pin of the spindle or of the head interacts with the joint block. The purpose of the joint blocks is essentially to carry out compensation with respect to length and direction between the joint spindles, which are changeable relative to each other within certain limits in their axial direction and the rigidly arranged coupling elements in the pinion and roll stand. In addition to the transmission of the high torques and the impact-like loads, as they occur during the start-up of the stands and primarily in very short sequences when tapping the rolling stock in the work rolls, the joint or sliding block has the added purpose of receiving additional relative movements under high surface pressures.

These various loads, many of which are superimposed, lead to a relatively quick and marked wear. Although it has always been attempted to increase the durability of the joint blocks by ever more suitable novel materials, for example, by the use of new materials, it is so far still necessary to frequently exchange the sliding blocks because of wear.

Aside from the costs of the replacement parts and the attendant storage capacity, and primarily because of the exchange of the sliding blocks, the time periods for idle and assembly times caused by the replacement of the sliding blocks are extremely long, because when exchanging the sliding blocks usually a complete separation of the joint spindles from the subsequent coupling elements is required. In the cost intensive rolling mill plants, the idle and assembly times caused by repairs are an extremely high burden, especially when they occur at unscheduled times.

For lowering these material costs, and especially for reducing the required material, a sliding block or joint block for joint spindles and joint coupling heads of rolling mill drives is known from DE 26 56 257 A1, which is composed of several partial sections. In this connection, dividing planes for the partial sections in the transverse direction of the longitudinal axis of the joint block are provided.

Moreover, WO 2004/072501 discloses a sliding block for giant spindles in drives of rolling mills, which permits a high surface pressure and, furthermore, also has a high resistance to heat. In this regard, the joint spindle has a wobbler with a flat pin whose tongue engages in a cylindrical opening of the spindle head extending transversely of the axis of rotation, wherein a sliding block is arranged between the spindle head and the flat pin. This sliding block is of a composite construction and has a metal inner body and an outer layer of polymer fiber material surrounding the inner body.

From GB 262 144 a joint spindle is known which effects a connection with an articulated head or with a wobbler. For this purpose, sliding blocks are used which have the shape of a truncated cone. GB 284 462 describes an articulated connection between a cam and a shaft in which elements with cylindrical surfaces are used.

The state of the art is illustrated in FIGS. 1 and 2. FIG. 1 shows in an exploded view a wobbler 2 equipped with a tongue 1 for connecting with a joint spindle 3.

FIG. 2 shows a sectional view perpendicular to the sectional view of FIG. 1 taken along sectional line II-II.

The joint spindle 3 has a joint head 4 which is equipped with a recess 5 for receiving the tongue 1. The tongue 1 is composed of two protruding elements 6, 7 forming a finger-shaped flat blade together with a cylindrical contour facing the outer side of the wobbler 1, and a parallelepiped-shaped contour facing the inner side of the wobbler 1. A sliding block 8 with two sliding plates 9, 10 is fastened on the elements 6, 7. The sliding plates 9, 10 have surfaces 11, 12 which rest in the recess 5 to make it possible that the sliding block 8 and the joint spindle can be turned or pivoted perpendicularly of the longitudinal axis x of the joint spindle 3 about an axis z. The surfaces 11, 12 are constructed in such a way that they fit into corresponding contours 13, 14 within the recess 5 in the joint head 4 of the joint spindle 3.

The joint blocks or sliding plates 9, 10 are connected to each other through a bolt 15 which protrudes into the wobbler recess formed by the elements 6, 7 and which generally is guided in a bore 16 or 17 in the sliding blocks 9 or 10, respectively. The relative movement between the joint head 4 and the wobbler 2 is carried out by the rotation of the sliding block 8 and by a pivoting movement of the elements 6, 7. The sliding plates 9, 10 must be guided through a stop, in order to prevent slipping of the sliding plates 9, 10 in the direction of the z axis. In a standard embodiment, a cylindrical groove 18 is provided for this purpose in the middle of the joint head 4 of a cylindrical groove 18 in which the sliding plates 9, 10 are placed with a guide cam 19.

In the past, it has been found that the increased output of the rolling plant causes stress fractures at these guide grooves.

SUMMARY OF THE INVENTION

It is the object of the invention to improve a joint spindle of the above-mentioned type in such a way that its productivity in the transmission of torques is increased.

In accordance with the invention, this object met in a joint spindle of the above-mentioned type by constructing the contours of the bodies of rotation so as to be convex or concave.

The invention prevents the formation of stress fractures without requiring special measures, such as rounding-off, polishing of the radii, or solidification of the radii. The invention provides a fundamental solution for a reduced stress level in the joint head without losing the necessary guiding properties. Instead of the guide groove, a uniformly spherically shaped contour extending symmetrically in two directions relative to the y axis which is superimposed on the total transverse sliding plate axis, i.e., the y axis.

Advantageous further developments of the invention are resolved from the dependent Claims, the specification, and the drawings.

It is particularly advantageous if the contours of the bodies of rotation in the partial areas have the shape of a drum or the shape of a one-sheeted hyperboloid.

The drum shape can be produced by rotating a curve having a spherical, elliptical, or parabolic curvature. The curvature makes it possible to adapt the shape of the curve with necessary transverse guidance of the sliding block to the optimum state of stress. A special case is the curve of the drum forming a circular arc section; in that case, depending on the embodiment, the play of the joints can be reduced or increased.

In accordance with a preferred feature, it can also be provided that the sliding block is under stress relative to the recess receiving the sliding block.

The joint spindle is advantageously constructed in the area of the joint head in such a way that the stress is determined by the shapes of the contours of the rotation bodies of the sliding block, on the one hand, and the recess, on the other hand, in relation to each other.

In accordance with an especially advantageous embodiment, the joint spindle is characterized in that the stress of the sliding block can be adjusted by an adjusting means which adjusts the distance of the two sliding blocks relative to each other, in particular an adjusting bolt.

The invention also relates to a sliding block for use in a joint spindle, as discussed in more detail above.

In the following, the invention will be explained in more detail in two embodiments. In the drawing:

BRIEF DESCRIPTION OF THE DRAWING

FIG. 3 is a perspective exploded view of a joint spindle according to the invention, with drum-shaped sliding blocks, FIG. 4 is a perpendicular sectional view from FIG. 3 along sectional line IV-IV, FIG. 5 is a perspective exploded view of a joint spindle according to the invention with sliding blocks in the form of a one-sheeted hyperboloid, FIG. 6 is a perpendicular sectional view from FIG. 5 along sectional line V-V.

DETAILED DESCRIPTION OF THE INVENTION

Figures 1, 2:
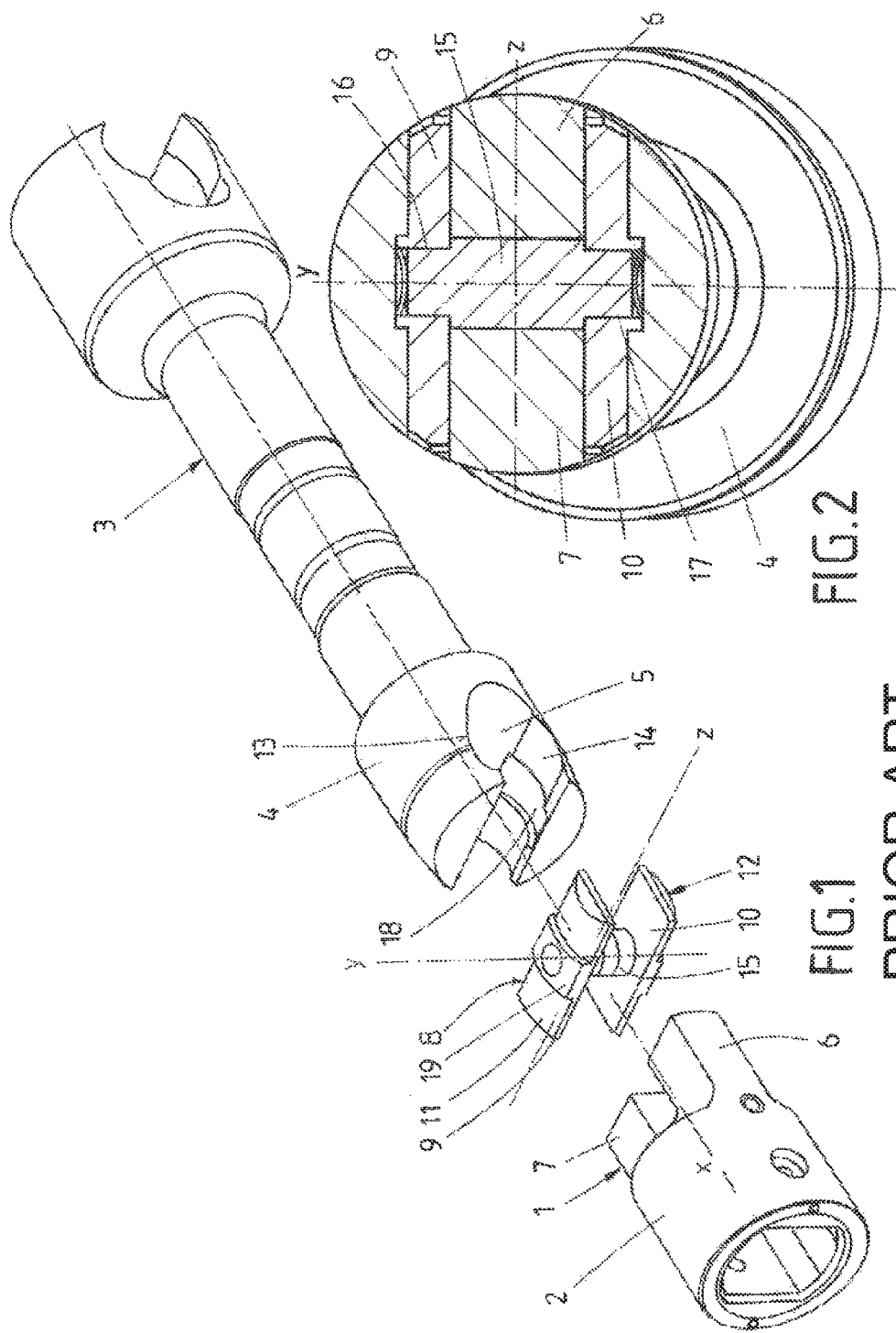
FIG. 1 shows an exploded view of a prior art wobbler.
FIG. 2 is a sectional view of FIG. 1 along the line II-II.

A wobbler 2 (FIGS. 3, 4) interacts in the manner known from the prior art (see FIGS. 1, 2), with two fingers 6, 7 with the joint head 4 of a spindle 3. In contrast to the prior art, a sliding block 20 is equipped with two sliding plates 21, 22 which each have drum-shaped surfaces 23, 24. As known from the prior art, the two sliding plates 21, 22 are also connected to each other through a bolt 15. In contrast to the prior art, no guide groove 18 is required in the recess 5 of the joint head 4 of the spindle 3, and a guide cam 19 is also not required.

Rather, it is sufficient and necessary that the recess has a concave contour 25 adjusted precisely to the convex surfaces 23, 24 with at least essentially the same curvature as the surfaces 23, 24.

In accordance with another embodiment (FIGS. 5, 6) of the invention, a sliding block 26 has two sliding plates 27, 28 which are each equipped with surfaces 29, 30 as sections of a one-sheeted hyperboloid. Also in this case, the sliding plates 27, 28 are connected to each other through a bolt 15. As in the case of the first embodiment, no guide groove 18 is required in the recess 5 of the joint head 4 of the spindle 3, and a guide cam 19 is also not required.

Rather, it is also here sufficient and necessary that the recess has a convex contour 31, precisely adapted to the concave surfaces 29, 30 with at least essentially the same curvature as the surfaces 29, 30.

In the embodiments of the sliding blocks 20, 26 according to the invention, the shape of the surfaces 23, 24 or 29, 30, respectively, ensure that the sliding blocks 20, 26 are placed in the contours 25, 31 so as to be self-centering and that, simultaneously, guide cams and guide grooves, as they are required in the state of the art, can be omitted.

LIST OF REFERENCES

1 tongue
2 wobbler
3 joint spindle
4 joint head
5 recess
6 element
7 element
8 sliding block
9 sliding plate
10 sliding plate
11 cylindrical surface
12 cylindrical surface
13 contour
14 contour
15 bolt
16 bore
17 bore
18 groove
19 guide cam
20 sliding block
21 sliding plate
22 sliding plate
23 surface
24 surface
25 contour
26 sliding block
27 sliding plate
28 sliding plate
29 surface
30 surface
31 contour

The invention claimed is:

1. A joint spindle arranged in a drive of a rolling mill, comprising:
a wobbler for effecting a connection to a joint head, or a joint head for effecting a connection to a wobbler, wherein the joint head has a cylindrical opening that extends through the joint head in a direction transversely to an axis of rotation, and the wobbler has a tongue that engages in the cylindrical opening of the joint head; and
a sliding block arranged between the joint head and the tongue, the sliding block being formed by two sliding bodies that have rotational body contours in partial areas, which sliding bodies being arranged rotatably in a recess in the opening in the joint head, which opening is adapted to the shape of the sliding bodies so that the sliding bodies can pivot in the joint head, wherein the sliding bodies each have a long side that extends in the direction that the opening extends through the joint head and a short side, wherein the contours are convex or concave in the direction of the long side of the sliding bodies and transverse to a longitudinal direction of the spindle, the contour of each of the sliding bodies being shaped to extend smoothly and continuously from a first outer end of the long side to a second, opposite outer end of the long side, and the recess is correspondingly shaped convex or concave.

2. The joint spindle according to claim 1, wherein the contours have in the partial areas have a drum shape or, a one-sheeted hyperboloid shape.

3. The joint spindle according to claim 2, wherein the shape of the drum is obtained by a rotation of a curve having a spherical, elliptical, or parabolic curvature.

4. The joint spindle according to claim 1, wherein the sliding block is under stress relative to the recess receiving it.

5. The joint spindle according to claim 4, wherein the stress is determined by the shapes of the contours of the rotational bodies of the sliding block and the recess.

6. The joint spindle according to claim 4, further comprising adjusting means for adjusting the stress of the sliding block relative to the recess, the adjusting means adjusting a distance of the two sliding bodies relative to each other.

7. The joint spindle according to claim 6, wherein the adjusting means includes an adjusting belt.

8. A sliding block for use in a joint spindle having a joint head with a cylindrical opening that extends through the joint head in a direction transversely to an axis of rotation, the sliding block being formed by two sliding bodies that have rotational body contours in partial areas, which sliding bodies being arranged rotatably in a recess in the joint head adapted to the shape of the sliding bodies so that the sliding bodies can pivot in the joint head, wherein the sliding bodies each have a long side that extends in the direction that the opening extends through the joint head and a short side, wherein the contours are convex or concave in the direction of the long side of the sliding bodies and transverse to a longitudinal direction of the spindle, the contour of each of the sliding bodies being shaped to extend smoothly and continuously from a first outer end of the long side to a second, opposite outer end of the long side, and the recess is correspondingly shaped convex or concave.

* * * * *